US008919324B2

(12) United States Patent
Parsons et al.

(10) Patent No.: US 8,919,324 B2
(45) Date of Patent: Dec. 30, 2014

(54) FUEL RAIL FOR LIQUID INJECTION OF A TWO-PHASE FUEL

(76) Inventors: Robin B. Parsons, Georgetown, TX (US); Paul Litterski, Georgetown, TX (US)

(*) Notice: Subject to any disclaimer, the term of this patent is extended or adjusted under 35 U.S.C. 154(b) by 442 days.

(21) Appl. No.: 13/314,372

(22) Filed: Dec. 8, 2011

(65) Prior Publication Data

US 2012/0145127 A1 Jun. 14, 2012

Related U.S. Application Data

(60) Provisional application No. 61/420,935, filed on Dec. 8, 2010.

(51) Int. Cl.
| | |
|---|---|
| *F02M 55/02* | (2006.01) |
| *F02M 37/20* | (2006.01) |
| *F02M 21/02* | (2006.01) |
| *F02M 69/46* | (2006.01) |
| *F02M 55/00* | (2006.01) |

(52) U.S. Cl.
CPC ............ *F02M 37/20* (2013.01); *F02M 55/007* (2013.01); *F02M 21/0212* (2013.01); *Y02T 10/32* (2013.01); *F02M 21/0287* (2013.01); *F02M 55/025* (2013.01); *F02M 69/465* (2013.01); *F02M 21/0257* (2013.01)
USPC ............................... 123/456; 123/470

(58) Field of Classification Search
USPC ......... 123/456, 468, 469, 470, 447, 531, 527, 123/27 GE
See application file for complete search history.

(56) References Cited

U.S. PATENT DOCUMENTS

| | | | |
|---|---|---|---|
| 4,422,420 A | 12/1983 | Cromas et al. | |
| 4,470,545 A | 9/1984 | Deckard et al. | |
| 4,552,311 A | 11/1985 | Casey | |
| 4,777,921 A | 10/1988 | Miyaki et al. | |
| 4,779,838 A | 10/1988 | Greiner et al. | |
| 5,109,885 A | 5/1992 | Tauscher | |
| 5,170,766 A | 12/1992 | Haas et al. | |
| 5,261,366 A | 11/1993 | Regueiro | |
| 5,423,303 A * | 6/1995 | Bennett ........................ | 123/527 |
| 5,488,970 A | 2/1996 | Cippitani | |
| 5,605,133 A | 2/1997 | Tuckey | |
| 5,673,853 A | 10/1997 | Crofts et al. | |
| 5,685,268 A | 11/1997 | Wakemen | |
| 5,852,997 A | 12/1998 | Vanderpoel | |
| 5,901,941 A | 5/1999 | Ricco | |
| 5,931,335 A | 8/1999 | Cippitani | |
| 5,950,932 A | 9/1999 | Takeda et al. | |
| 6,016,791 A | 1/2000 | Thomas et al. | |
| 6,035,830 A | 3/2000 | Saito | |

(Continued)

*Primary Examiner* — Mahmoud Gimie
(74) *Attorney, Agent, or Firm* — DuBois, Bryant & Campbell LLP; William D. Wiese

(57) ABSTRACT

In one embodiment, the fuel rail may include an inlet channel, one or more injector cavities with a fuel gallery, and an outlet channel. The fuel in an injector cavity may exist in varying ratios of liquid-to-vapor phase with liquid-phase fuel in a middle or lower portion of the injector cavity and with the vapor-phase fuel in an upper portion of the injector cavity. The inlet channel and the outlet channel may each intersect with the injector cavities on opposing sides of the injector cavities. The inlet channel may provide liquid-phase fuel to each injector cavity in a parallel manner. As the liquid-phase fuel is pumped into each injector cavity through the inlet channel, vapor-phase fuel in the injector cavities may be purged to the outlet channel in a parallel manner.

33 Claims, 3 Drawing Sheets

(56) References Cited

U.S. PATENT DOCUMENTS

| | | |
|---|---|---|
| 6,067,964 A | 5/2000 | Ruoff et al. |
| 6,142,121 A | 11/2000 | Nishimura et al. |
| 6,205,978 B1 | 3/2001 | Zoeller |
| 6,405,711 B1 * | 6/2002 | Smith et al. .................. 123/456 |
| 6,422,203 B1 | 7/2002 | Djordjevic |
| 6,494,182 B1 | 12/2002 | Djordjevic |
| 6,505,612 B1 * | 1/2003 | Cipressi et al. ............... 123/527 |
| 6,520,151 B2 | 2/2003 | Desai et al. |
| 6,546,917 B2 | 4/2003 | Onishi et al. |
| 6,609,500 B2 | 8/2003 | Ricco et al. |
| 6,637,408 B2 | 10/2003 | Djordjevic |
| 6,792,916 B2 | 9/2004 | Oashi |
| 6,793,196 B2 | 9/2004 | Van Weelden et al. |
| 6,807,943 B2 | 10/2004 | Van Weelden et al. |
| 6,854,445 B2 | 2/2005 | Okamoto |
| 6,912,983 B2 | 7/2005 | Okamoto et al. |
| 7,182,067 B2 | 2/2007 | Ricco et al. |
| 7,210,461 B2 | 5/2007 | Schreeck et al. |
| 7,334,570 B2 | 2/2008 | Klyza |
| 2002/0043249 A1 | 4/2002 | Lee et al. |
| 2003/0034011 A1 | 2/2003 | Djordjevic |
| 2003/0230282 A1 * | 12/2003 | Braun et al. .................. 123/456 |
| 2004/0103885 A1 | 6/2004 | Van Weelden et al. |
| 2004/0211394 A1 * | 10/2004 | Yager et al. .................. 123/468 |
| 2006/0231079 A1 | 10/2006 | Paluszewski |
| 2008/0036465 A1 | 2/2008 | Graf et al. |
| 2010/0010727 A1 | 1/2010 | Cippitani |
| 2010/0324801 A1 | 12/2010 | Cippitani |

* cited by examiner

FUEL RAIL FOR LIQUID INJECTION OF A TWO-PHASE FUEL

PRIORITY STATEMENT UNDER 35 U.S.C. §119 & 37 C.F.R. §1.78

This non-provisional patent application claims priority based upon prior U.S. Provisional Patent Application Ser. No. 61/420,935 filed Dec. 8, 2010 in the name of Robin B. Parsons and Paul Litterski entitled "Automotive Liquid Propane Fuel Injection System Fuel Rail," the disclosure of which is incorporated herein in its entirety by reference.

BACKGROUND

The present invention relates generally to fuel injection systems and, more particularly, to a fuel rail for fuel injection of a two-phase fuel.

Fuel injection systems having a plurality of electrically actuated fuel injector valves ("injectors") receiving fuel from a common fuel rail are known in the art. In these systems, fuel under pressure from a fuel pump is distributed to the individual injectors by means of a common fuel rail. Traditional common fuel rails have a single fuel inlet port and deliver fuel to the injectors in series. Fuel injection systems may be designed to inject single-phase fuels such as diesel and gasoline or two-phase fuels which commonly include fuels such as liquid propane gas, methane, ammonia, liquid natural gas, and combinations thereof.

Fuel injection systems that inject a two-phase fuel in a liquid phase (a "liquid-phase fuel injection system") demonstrate superior engine power and cold start performance over fuel injection systems that inject a two-phase fuel in a vapor phase. Liquid-phase fuel injection systems do present challenges, however, such as that of keeping the two-phase fuel in a liquid phase at the point of injection. For example, in hot soak conditions (such as when the engine has been turned off but is still hot), the liquid two-phase fuel can vaporize in the fuel rail, resulting in an inherently lower density fuel charge at the fuel injectors. In such cases, the engine management system cannot typically distinguish between the liquid and vapor phase of the two-phase fuel and, therefore, will deliver inadequate fuel quantity when the engine is restarted. Some liquid phase fuel injection systems attempt to address this problem by first displacing fuel vapor from the fuel rail upon a restart. The time required for such displacement (the "purge time") is typically in the range of twenty to thirty seconds which is undesirable in many applications. In some cases, the fuel vapor is displaced through the engine which can create undesirable emissions.

In addition to hot soak conditions, a two-phase fuel may transform into the vapor phase in a fuel rail if the pressure in the fuel rail drops too much as the fuel is delivered in series to each of the injectors. As a result, many traditional liquid two-phase-fuel injection systems are designed to run at high pressures which can reduce durability of the system, increase cost, and increase the difficulty of delivering the two-phase fuel in uniform quantities to the injectors.

BRIEF SUMMARY

In accordance with one embodiment of the present invention, a fuel rail may include an inlet channel, one or more injector cavities with a fuel gallery, and an outlet channel. Under normal conditions, fuel in the one or more injector cavities may exist in a liquid phase. In severe hot soak conditions, the fuel in the injector cavities may separate into a liquid phase and a vapor phase. For example, the fuel in an injector cavity may exist in varying ratios of liquid-to-vapor phase with the liquid-phase fuel in a fuel gallery at a middle or lower portion of the injector cavity and with the vapor-phase fuel in an upper portion of the injector cavity. The vapor-phase fuel may be purged from the injector cavities to the outlet channel and returned to the fuel tank. The liquid-phase fuel in the fuel galleries may supply the injectors.

The inlet channel and the outlet channel may pass through the length of the fuel rail with the inlet channel in the middle or the lower half of the fuel rail and the outlet channel in the upper portion of the fuel rail. The inlet channel and the outlet channel may each intersect the injector cavities on opposing sides of the injector cavities. The inlet channel may provide liquid-phase fuel to each injector cavity in a parallel manner. As the liquid-phase fuel is pumped into each injector cavity through the inlet channel, vapor-phase fuel in the injector cavities may be purged from the injector cavities and into the outlet channel in a parallel manner, and returned to the fuel tank.

It can be appreciated that there is a significant need for an improved fuel rail that reduces the purge time of a fuel injection system. It can further be appreciated that there is a significant need for an improved fuel rail that reduces the costs of a fuel injection system. It can further be appreciated that there is a significant need for an improved fuel rail that improves the durability of a fuel injection system. It can further be appreciated that there is a significant need for an improved fuel rail that balances fuel pressure between injectors. It can further be appreciated that there is a significant need for an improved fuel rail that delivers a two-phase fuel in uniform quantities to the injectors. It can further be appreciated that there is a significant need for an improved fuel rail that allows a fuel injection system to operate at a low pressure. Embodiments of the present invention can provide these and other advantages, as will be apparent from the following description and accompanying figure.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

In accordance with one embodiment of the present invention, a fuel rail may include an inlet channel, one or more injector cavities with a fuel gallery, and an outlet channel. Under normal conditions, fuel in the one or more injector cavities may exist in a liquid phase. In severe hot soak conditions, the fuel in the injector cavities may separate into a liquid phase and a vapor phase. For example, the fuel in an injector cavity may exist in varying ratios of liquid-to-vapor phase with the liquid-phase fuel in a fuel gallery at a middle or lower portion of the injector cavity and with the vapor-phase fuel in an upper portion of the injector cavity. The vapor-phase fuel may be purged from the injector cavities to the outlet channel and returned to the fuel tank. The liquid-phase fuel in the fuel galleries may supply the injectors.

The inlet channel and the outlet channel may pass through the length of the fuel rail with the inlet channel in the middle or the lower half of the fuel rail and the outlet channel in the upper portion of the fuel rail. The inlet channel and the outlet channel may each intersect the injector cavities on opposing sides of the injector cavities. The inlet channel may provide liquid-phase fuel to each injector cavity in a parallel manner. As the liquid-phase fuel is pumped into each injector cavity through the inlet channel, vapor-phase fuel in the injector cavities may be purged from the injector cavities and into the outlet channel in a parallel manner, and returned to the fuel tank.

Figure 1:
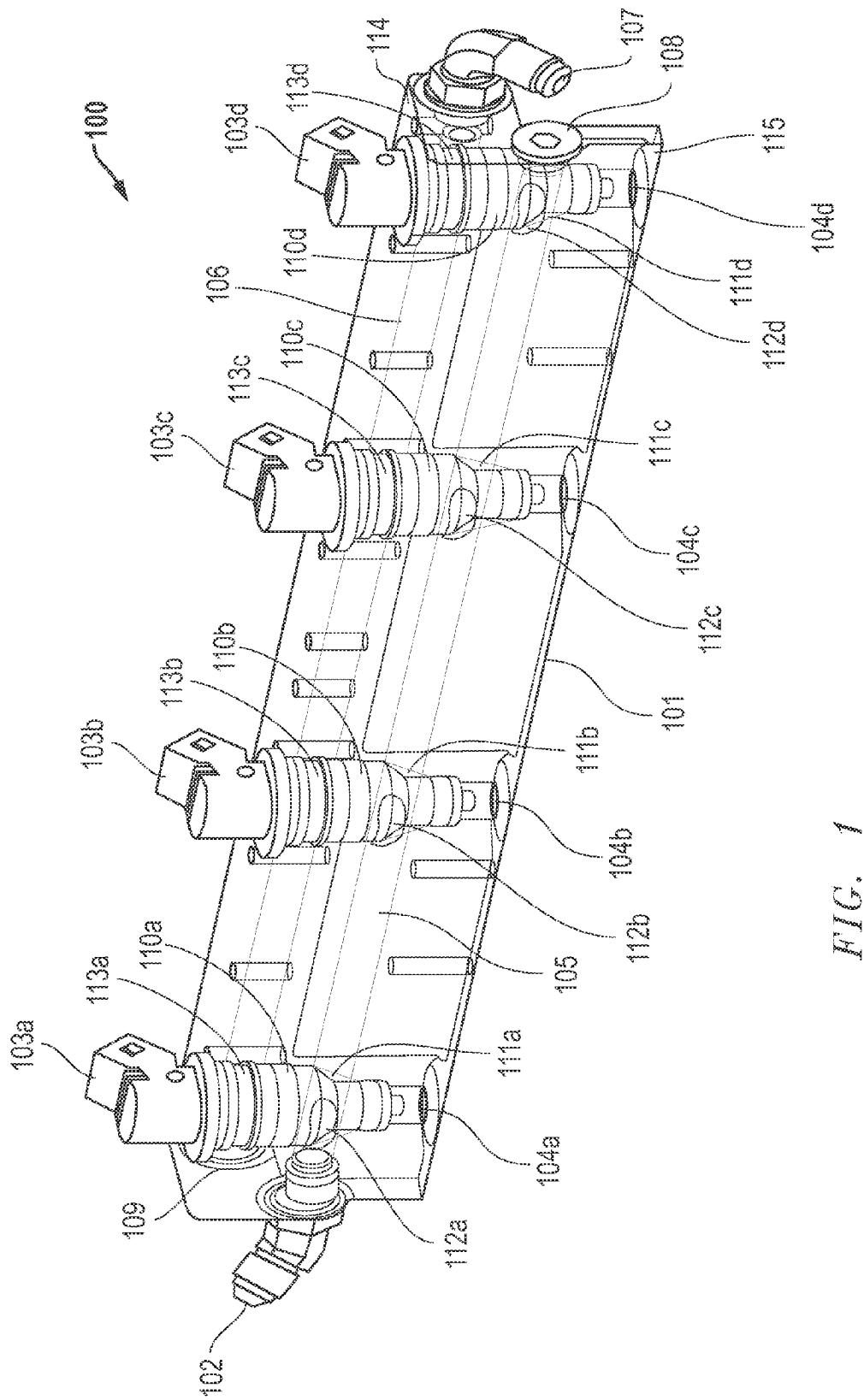
FIG. 1 is a perspective view of a fuel rail in one embodiment of the present invention.

Reference is now made to FIG. 1, which is a perspective view of a fuel rail 100 in one embodiment of the present invention. In this embodiment, the fuel rail 100 is configured for bottom-feed injection into an engine (not shown). In other embodiments, the fuel rail 100 may be configured for top-feed injection. The fuel rail 100 may be formed from an aluminum block 101. In this embodiment, the fuel rail 100 is shown to include four injector cavities 110a-d. An injector 103a-d is shown to be placed in each of the injector cavities 110a-d.

The injector cavities 110a-d may be configured to include a clearance around the outer surface of the injectors 104-a-d. The clearance or space between the walls of the injector cavities 110a-d and the outer surface of the injectors 104a-d may form a passage that allows fuel to gather and/or flow between the upper, middle, and lower portions of the injector cavities 110a-d. This space may include a fuel gallery 111 which has a capacity for storing fuel. Each of the injector cavities 110a-d may also include an injection port 104. Upon receipt of an appropriate signal, the injector 103 may open a valve that allows fuel to flow from the injector cavity 110, through the injection port 104, and to the engine.

The fuel rail 100 may be configured with an inlet channel 105 that runs the length of the block 101. In this embodiment, an inlet port 102 is shown connected to the far end of the inlet channel 105 at the far end of the block 101. The inlet port 102 may be in communication with the inlet channel 105 and may receive liquid fuel that is pumped from the fuel tank. An inlet channel cap 108 is shown connected to the near end of the inlet channel 105 at the near end of the block 101. The inlet channel cap 108 may be configured to prevent fuel in the inlet channel 105 from flowing out the near end of the inlet channel 105 at the near end of the block 101. In one embodiment, the block 101 may be configured such that the inlet port 102 may be connected to the inlet channel 105 at either the far end or the near end of the inlet channel 105 and the inlet channel cap 108 may be connected to opposite end of the inlet channel 105 that contains the inlet port 102, whether such opposite end is the far end or the near end. In this embodiment, the inlet channel 105 is positioned approximately equal distance between the top 114 of the block 101 and the bottom 115 of the block 101.

In this embodiment, the inlet channel 105 is shown to be positioned closer to the near side of the block 101 than to the far side of the block 101. In addition, the inlet channel 105 is shown to intersect each of the injector cavities 110a-d such that a portion of the inlet channel 105 overlaps with a portion of the injector cavity 110 to create an inlet channel overlap 112. In this configuration, the flow rate of fuel flowing through the inlet channel 105 may be slowed by fuel residing in the injector cavity 110, and in particular, the fuel gallery 111. As a result, the pressure drop in the inlet channel 105 across each injector cavity 110a-d, and across the inlet channel 105 as a whole, may be reduced. In addition, the inlet pressure necessary for introducing fuel into the fuel rail 100 may be reduced.

The fuel rail 100 may be similarly configured with an outlet channel 106 which runs the length of the block 101. In this embodiment, an outlet port 107 is shown connected to the near end of the outlet channel 106 at the near end of the block 101. The outlet port 107 is shown to be in communication with the outlet channel 106. The outlet port 107 may send unused liquid from the fuel rail 100 back to the fuel tank. An outlet channel cap 109 is shown connected to the far end of the outlet channel 106 at the far end of the block 101. The outlet channel cap 109 is configured to prevent fuel in the outlet channel 106 from flowing out the end of the outlet channel 106 at the far end of the block 101. In one embodiment, the block 101 may be configured such that the outlet port 107 may be connected to the outlet channel 106 at either the far end or the near end of the outlet channel 106 and the outlet channel cap 109 may be connected to opposite end of the outlet channel 106 that contains the outlet port 107, whether such opposite end is the far end or the near end. In this embodiment, the outlet channel 106 is positioned between the top 114 and bottom 115 of the block at location approximately eighteen percent of total distance from the top 114 of the block 101 to the bottom 115 of the block 101.

In one embodiment, the fuel rail 100 may be configured with the inlet port 102 and the outlet port 107 at opposite ends of the fuel rail 100. In other embodiments, the fuel rail 100 may be configured with the inlet port 102 and the outlet port 107 at the same end of the fuel rail 100.

In this embodiment, the outlet channel 106 is shown to be positioned closer to the far side of the block 101 than to the near side of the block 101. In addition, the outlet channel 106 is shown to intersect each of the injector cavities 110 such that a portion of the outlet channel 106 overlaps with a portion of the injection cavity 110 to create an outlet channel overlap 113. In this configuration, the flow rate of fuel flowing through the outlet channel 106 may be slowed by fuel residing in the injector cavity 110 and in, particular, the outlet channel overlap 113. As a result, the pressure drop in the outlet channel 106 across each injector cavity 110 and across the outlet channel 106 as a whole, may be reduced. In addition, the inlet pressure necessary for introducing fuel into the fuel rail 100 may be reduced.

Under conditions, such as that of a hot soak, in which the two-phase fuel may separate into a liquid phase and a vapor phase, the configuration of the fuel rail 100 may prevent the introduction of the fuel that has separated into the vapor phase from being introduced into the engine for two reasons. First, to the extent that fuel in the injector cavity 110 separates into a vapor phase, the vapor-phase fuel may be inclined to migrate upwards, away from the fuel gallery 111, and towards the upper portion of the injector cavity 110. Since the upper portion of the injector cavity 110 is in the vicinity of the outlet channel overlap 113, the vapor-phase fuel is less likely to be sent through the injection port 104 at the bottom the injector cavity 100, and the liquid-phase fuel in the fuel gallery 111 is more likely to be sent through the injection port 104, upon a restart. Second, upon a restart, fresh liquid-phase fuel will flow from a fuel tank through the inlet port 102 and into the inlet channel 105. This liquid-phase fuel may flow into the inlet channel overlaps 112a-d and into the space between the walls of the injector cavities 110a-d and the surface of the injectors 103. This space may include the fuel galleries 111a-d. In this manner, vapor-phase fuel in the injector cavity 110 may be displaced from the injector cavity 110 to the outlet channel 106. The vapor-phase fuel may be further displaced from the outlet channel 106 and may return to the fuel tank through the outlet port 107.

Figure 2:
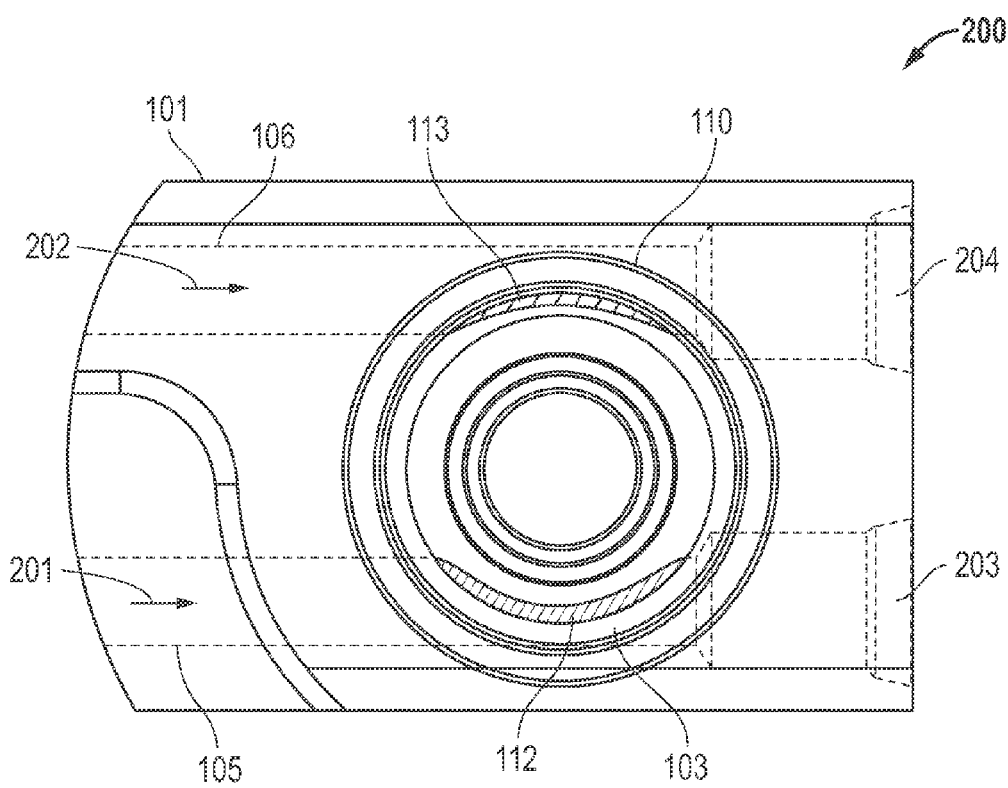
FIG. 2 is a top view of a portion of a fuel rail in one embodiment of the present invention.

Reference is now made to FIG. 2, which is a top view of a portion of a fuel rail 200 in one embodiment of the present invention. In this embodiment, the diameter of the inlet channel 105 is shown to vary along its length. In a first portion of the inlet channel 105, fuel may flow in a direction 201 towards the injector cavity 110 and the diameter of the inlet channel is shown to be approximately fifteen to sixteen percent of the width of the block 101 or approximately nineteen percent of the largest width of the injector cavity 110. The width of the inlet channel 105 is shown to narrow as the inlet channel 105 passes the injector cavity 113. The inlet channel overlap 112 is shown in a crescent configuration. An end portion 203 of the inlet channel 105 is shown to have a larger diameter than other portions of the inlet channel 105. The size of the end portion 203 may allow for the connection, in this embodiment, of the inlet channel cap 108.

Similarly, the diameter of the outlet channel 106 is shown to vary along its length. In a first portion of the outlet channel 106, fuel may flow in a direction 202 towards the injector cavity 110 and the diameter of the outlet channel 106 is shown to be approximately fifteen to sixteen percent of the width of the block 101 or approximately nineteen percent of the largest width of the injector cavity 110. The width of the outlet channel 106 is shown to narrow as the outlet channel 106 passes the injector cavity 113. The outlet channel overlap 113 is shown in a crescent configuration. An end portion 204 of the outlet channel 106 is shown to have a larger diameter than other portions of the outlet channel 106. The size of the end portion 204 may allow for the connection, in this embodiment, of the outlet port 107.

Figure 3:
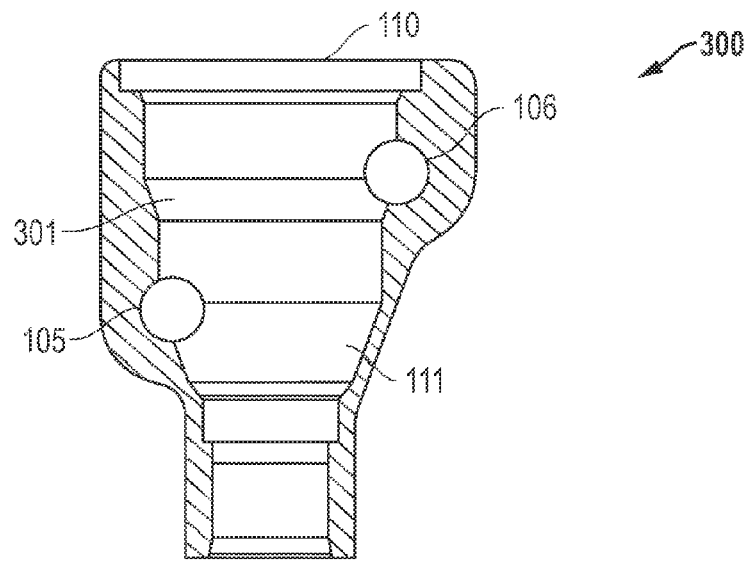
FIG. 3 is a cut-away side view of a fuel rail in one embodiment of the present invention.

Reference is now made to FIG. 3, which is a cut-away side view of a fuel rail 300 in one embodiment of the present invention. In this embodiment, the inlet channel 105 is shown to be approximately equal distance between the top and bottom of the fuel rail 101. The inlet channel 105 may be offset from the center of the injector cavity 110 such that the inlet channel 105 intersects the left side of the injector cavity 110. The fuel gallery 111 is shown in the portion of the injector cavity 110 that is just below the portion of the injector cavity 110 that intersects with the inlet channel 105. In this embodiment, the outlet port 106 is shown to intersect an upper portion of the injector cavity 110. This embodiment also includes an upper fuel gallery 301 which is shown in the upper portion of the injector cavity 110 located just below the portion of the injector cavity 110 that intersects with the outlet channel 106.

Figure 4:
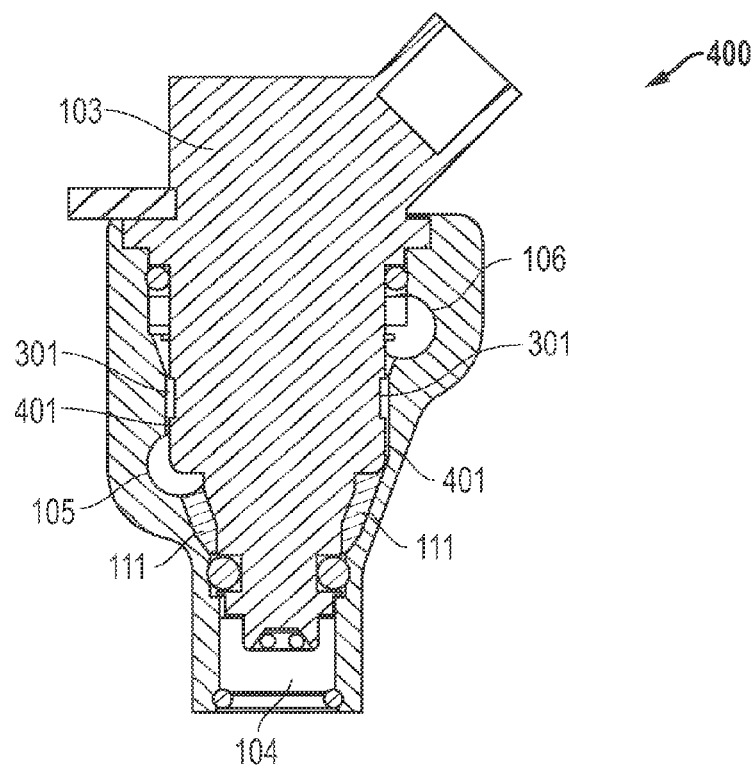
FIG. 4 is a cut-away side view of an injector cavity of a fuel rail in one embodiment of the present invention.

Reference is now made to FIG. 4, which is a cut-away side view of an injector cavity 110 of a fuel rail 400 in one embodiment of the present invention. In this embodiment, the injector 103 is shown to occupy a majority of the injector cavity 110. The inlet channel 105 is shown to the left of the injector cavity and is shown to intersect with a portion of the fuel gallery 111. The fuel gallery 111 is shown in a lower portion of the injector cavity 110 and is in communication with the outlet channel 106 through the passages 401 formed between the walls of the injector cavity 110 and the outer surface of the injector 103. In this embodiment, the injector cavity 110 also includes an upper fuel gallery 301.

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible devices and methods for controlling evaporative engine emissions, the detailed embodiments are intended to be illustrative only and should not be taken as limiting the scope of the invention. Rather, what is claimed as the invention is all such modifications as may come within the spirit and scope of the following claims and equivalents thereto.

None of the descriptions in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

We claim:

1. A fuel rail comprising:
   an injector cavity having an injector positioned therein, said injector cavity configured to include a passage outside of said injector but within said injector cavity from a lower portion of said injector cavity to an upper portion of said injector cavity;
   an inlet channel that intersects a middle or lower portion of said injector cavity; and
   an outlet channel that intersects said upper portion of said injector cavity, wherein a fluid may flow between said inlet channel through said passage to said outlet channel without passing through said injector.

2. The fuel rail in claim 1 wherein said lower portion of said injector cavity includes a fuel gallery.

3. The fuel rail in claim 1 wherein said lower portion of said injector cavity includes an injection port.

4. The fuel rail of claim 1 wherein the diameter of said inlet channel narrows at the intersection of said inlet channel with said middle or lower portion of said injector cavity.

5. The fuel rail of claim 1 wherein the diameter of said outlet channel narrows at the intersection of said outlet channel with said upper portion of said injector cavity.

6. The fuel rail of claim 1 wherein said inlet channel extends the length of said fuel rail.

7. The fuel rail of claim 1 wherein said outlet channel extends the length of said fuel rail.

8. The fuel rail of claim 1 wherein said inlet channel intersects a middle portion of said injector cavity on a first side of said at least one injector cavity and said outlet channel intersects said upper portion of said injector cavity on a second side of said injector cavity.

9. The fuel rail of claim 1 wherein said upper portion of said injector cavity includes an upper fuel gallery.

10. The fuel rail of claim 1 wherein said passage consists of the space between an injector inserted into said injector cavity and the sides of said at least one injector cavity.

11. A fuel rail comprising:
a single block including an inlet channel that extends the length of said block, an outlet channel that extends the length of said block, and multiple injector cavities with injectors positioned therein such that each of the multiple injector cavities intersect with said inlet channel and with said outlet channel so that fluid may flow between said inlet channel through said injector cavity to said outlet channel without passing through said injectors.

12. The fuel rail of claim 11 wherein at least one of said multiple injector cavities are configured to include a passage between the walls of said at least one of said multiple injector cavities and the surface of an injector inserted into said at least one of said multiple injector cavities.

13. The fuel rail of claim 11 wherein a middle portion of said multiple injector cavities intersect with said inlet channel.

14. The fuel rail of claim 11 wherein an upper portion of said multiple injector cavities intersect with said outlet channel.

15. The fuel rail in claim 11 wherein a lower portion of said multiple injector cavities include a fuel gallery.

16. The fuel rail of claim 11 wherein a lower portion of said multiple injector cavities include an injector port.

17. The fuel rail of claim 11 wherein the diameter of said inlet channel narrows at the intersection of said inlet channel with said multiple injector cavities.

18. The fuel rail of claim 11 wherein the diameter of said outlet channel narrows at the intersection of said outlet channel with said multiple injector cavities.

19. The fuel rail of claim 11 wherein said inlet channel intersects a middle portion of said multiple injector cavities on a first side of said multiple injector cavities and said outlet channel intersects an upper portion of said multiple injector cavities on a second side of said multiple injector cavities.

20. The fuel rail of claim 11 wherein said multiple injector cavities are configured such that a portion of an injector inserted into one of said multiple injector cavities will extend into a portion of said inlet channel.

21. The fuel rail of claim 11 wherein said multiple injector cavities are configured such that a portion of an injector inserted into one of said multiple injector cavities will extend into a portion of said outlet channel.

22. A method of managing the phase of a fuel in a fuel rail comprising:
pumping fuel into an inlet channel such that said fuel flows from said inlet channel into a middle portion of an injector cavity configured to include a passage outside of said injector but within said injector cavity;
storing a portion of said fuel in a fuel gallery in a lower portion of said injector cavity; and
purging fuel from said injector cavity through said passage into an outlet channel in the upper portion of said fuel rail.

23. The method of claim 22 wherein said inlet channel extends the length of said fuel rail.

24. The method of claim 22 wherein said outlet channel extends the length of said fuel rail.

25. The method of claim 22 further comprising storing fuel in a fuel gallery in an upper portion of said injector cavity.

26. The method of claim 22 further comprising injecting fuel from said fuel gallery through an injection port in a lower portion of said injector cavity.

27. The method of claim 22 further comprising pumping fuel from said outlet channel to a fuel tank.

28. The method of claim 22 wherein said injector cavity is configured to include a passage between the walls of said injector cavity and the surface of an injector inserted into said injector cavity.

29. The method of claim 22 wherein said inlet channel intersects a middle portion of said injector cavity.

30. The method of claim 22 wherein said outlet channel intersects an upper portion of said injector cavity.

31. The method of claim 22 wherein the diameter of said inlet channel narrows at the location that said fuel flows from said inlet channel into said middle portion of said injector cavity.

32. The method of claim 22 wherein the diameter of said outlet channel narrows at the location that fuel is purged from said injector cavity into said outlet channel.

33. The method of claim 22 wherein said pumping fuel into said inlet channel occurs on a first side of said injector cavity and said purging fuel from said injector cavity into said outlet channel occurs on a second side of said injector cavity.

* * * * *